(12) United States Patent
Rathsack

(10) Patent No.: US 7,976,046 B2
(45) Date of Patent: Jul. 12, 2011

(54) LEAN TO STEER RECUMBENT VEHICLE

(76) Inventor: Lawrence Rathsack, Brooklyn Park, MN (US)

( * ) Notice: Subject to any disclaimer, the term of this patent is extended or adjusted under 35 U.S.C. 154(b) by 144 days.

(21) Appl. No.: 12/074,660

(22) Filed: Mar. 5, 2008

(65) Prior Publication Data

US 2009/0224524 A1   Sep. 10, 2009

(51) Int. Cl.
*B62K 5/04* (2006.01)
(52) U.S. Cl. .............. 280/282; 280/288.1; 280/267
(58) Field of Classification Search .......... 280/288.1, 280/267, 282, 269, 266, 210
See application file for complete search history.

(56) References Cited

U.S. PATENT DOCUMENTS

| | | | |
|---|---|---|---|
| 4,360,224 A | 11/1982 | Sato et al. | |
| 4,548,421 A | 10/1985 | Wiener | |
| 4,903,857 A * | 2/1990 | Klopfenstein | 280/267 |
| 5,069,469 A | 12/1991 | Rosengrant et al. | |
| 5,145,196 A | 9/1992 | Langkamp | |
| 5,240,267 A | 8/1993 | Owsen | |
| 5,263,732 A * | 11/1993 | Harmeyer | 280/288.1 |
| 5,419,574 A | 5/1995 | Krumm | |
| 5,484,152 A | 1/1996 | Nunes et al. | |
| 5,544,906 A | 8/1996 | Clapper | |
| 5,568,935 A * | 10/1996 | Mason | 280/282 |
| 5,630,774 A * | 5/1997 | Geschwender | 482/57 |
| 5,730,453 A * | 3/1998 | Owsen | 280/282 |
| 5,762,351 A * | 6/1998 | SooHoo | 280/267 |
| 6,105,986 A * | 8/2000 | Franks et al. | 280/250 |
| 6,203,043 B1 * | 3/2001 | Lehman | 280/288.1 |
| 6,367,824 B1 | 4/2002 | Hayashi | |
| 6,402,174 B1 * | 6/2002 | Maurer | 280/267 |
| 6,572,130 B2 * | 6/2003 | Greene et al. | 280/266 |
| 6,938,907 B2 * | 9/2005 | Hamy | 280/87.042 |
| 7,234,718 B1 * | 6/2007 | Morrow et al. | 280/281.1 |
| 7,467,802 B2 * | 12/2008 | Peng et al. | 280/124.103 |
| 7,487,985 B1 * | 2/2009 | Mighell | 280/124.103 |
| 2005/0253355 A1 | 11/2005 | Nacer | |
| 2006/0035760 A1 | 2/2006 | Hill | |

* cited by examiner

*Primary Examiner* — Joanne Silbermann
*Assistant Examiner* — Tashiana Adams
(74) *Attorney, Agent, or Firm* — Roger Belfay

(57) ABSTRACT

Two versions of recumbent human powered three wheeled vehicles are disclosed. Both are of the tadpole type with two front wheels and one rear drive wheel. Both versions lean into turns causing weight transfer toward the inside of turns to prevent rollover during turns at speed.

4 Claims, 16 Drawing Sheets

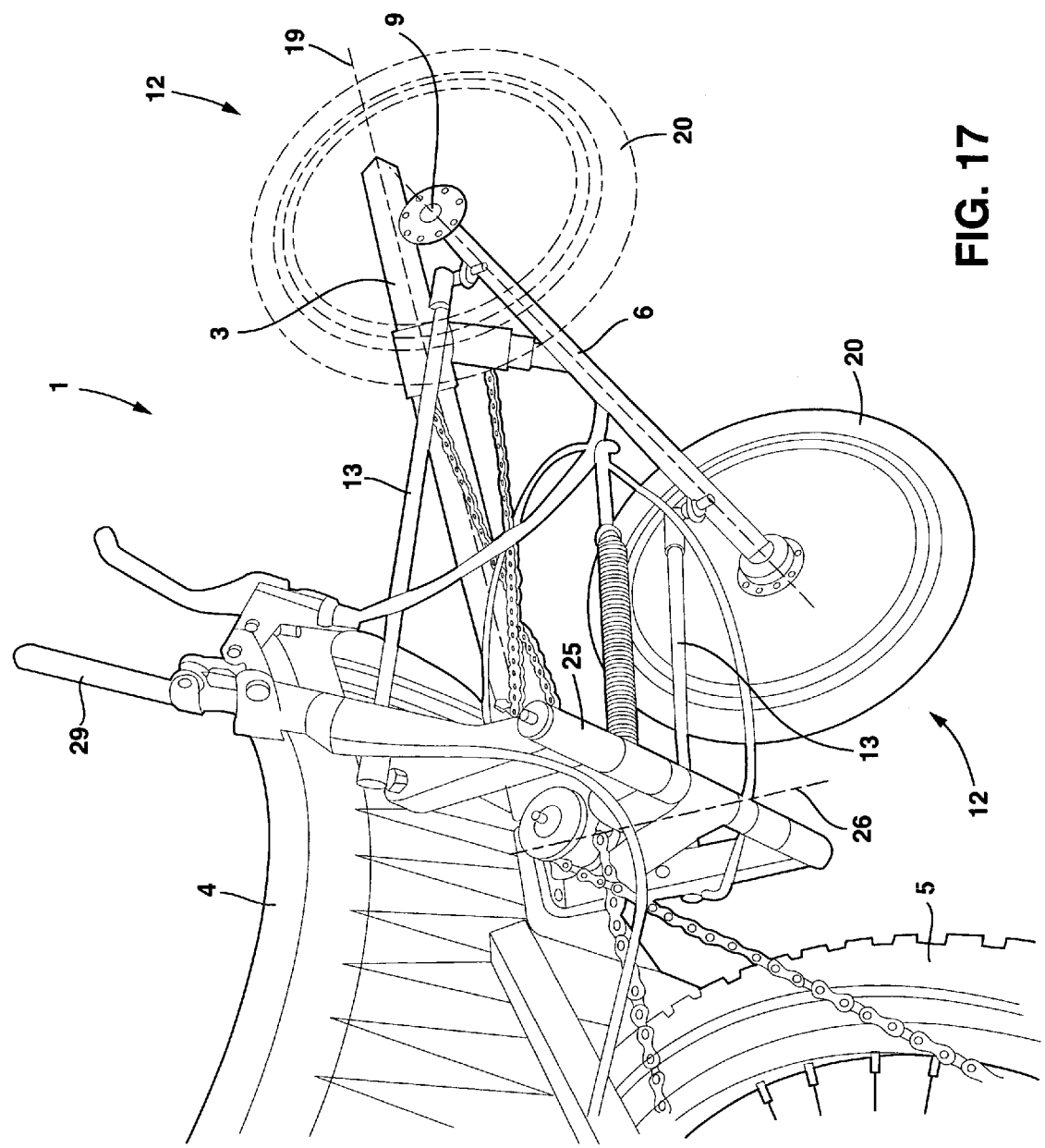

LEAN TO STEER RECUMBENT VEHICLE

The Lean to Steer Vehicle is a multi-wheeled vehicle wherein steering is related to operator lean.

CROSS REFERENCE TO RELATED APPLICATIONS

There are no applications related to this application.

STATEMENT REGARDING FEDERAL SPONSORSHIP

No invention claimed in this application was made under Federally sponsored research or development.

BACKGROUND OF INVENTION

A large number of Bicycles, Tricycles, and other multi-wheeled human powered vehicles, both recumbent and upright, are known.

The utility patent application by Hill (US Utility Patent Application Publication No. 20060035760) is typical of a class of cycles designed to promote fitness through exercise by providing the user with the exercise generally associated with the cycling while remaining in a fixed location. The present invention is directed to providing human powered locomotion.

The utility patent application by Nacer (US Utility Patent Application publication No. 20050253355) is typical of a class of cycles designed to enhance human powered cycling by provision of power assistance in times of need climbing steep inclines. The present invention is directed to a human powered vehicle which may or may not include such a power assist scheme and is independent of any power assist mechanism which might be provided.

The utility patents to Clapper (U.S. Pat. No. 5,544,906), Wiener (U.S. Pat. No. 4,548,421), Hayashi (U.S. Pat. No. 6,367,824), Nunes et al (U.S. Pat. No. 5,484,152), Owsen (U.S. Pat. No. 5,240,267), Langkamp (U.S. Pat. No. 5,145,196), Sato et al (U.S. Pat. No. 4,360,224), and Rosengrant et al (U.S. Pat. No. 5,069,469) are typical of a class of cycles in which the operator steers the vehicle using his hands to steer the vehicle. The present invention is directed to a cycle which the operator steers by leaning in the direction of the turn.

The utility patent to Maurer (U.S. Pat. No. 6,402,174) is typical of a class of cycles designed to provide or permit the operator to lean to the inside of a turn in response to vehicle turns resulting from steering. In this class of cycles the steering is produced by operator manual actions and the stability of the vehicle is enhanced by permitting the operator to lean toward the center of the turning circle. The present invention is directed to a cycle which the operator steers by leaning in the direction of the turn.

The utility patent to Krumm (U.S. Pat. No. 5,419,574) is typical of a class of cycles in which the relative position of the seat, pedals, and steering handles may be adjusted by adjusting the length of the connecting members. The present invention is directed to a vehicle in which these adjustments can be made by relocating the seat, pedals, and steering mechanism along a central support member.

BRIEF SUMMARY OF THE INVENTION

Both types of this invention are three wheeled leaning recumbent, human powered vehicles. They are of the tadpole type with two wheels in front and one wheel in back. They are meant for able bodied adults who desire a fun safe ride while getting exercise out of doors.

The lean to steer version leans all three wheels while negotiating turns. This causes a weight transfer toward the inside of the turning circle. This action offers greater stability than prior art while using fewer parts.

In the steer lean version only the rear wheel main frame, seat, and pedals lean. The front axle pivots about its center in a castering type movement. This also causes a weight transfer for better stability.

BRIEF DESCRIPTION OF THE DRAWINGS

FIG. 17 is a detail view of a second tie rod embodiment.

DETAILED DESCRIPTION

Figure 1:
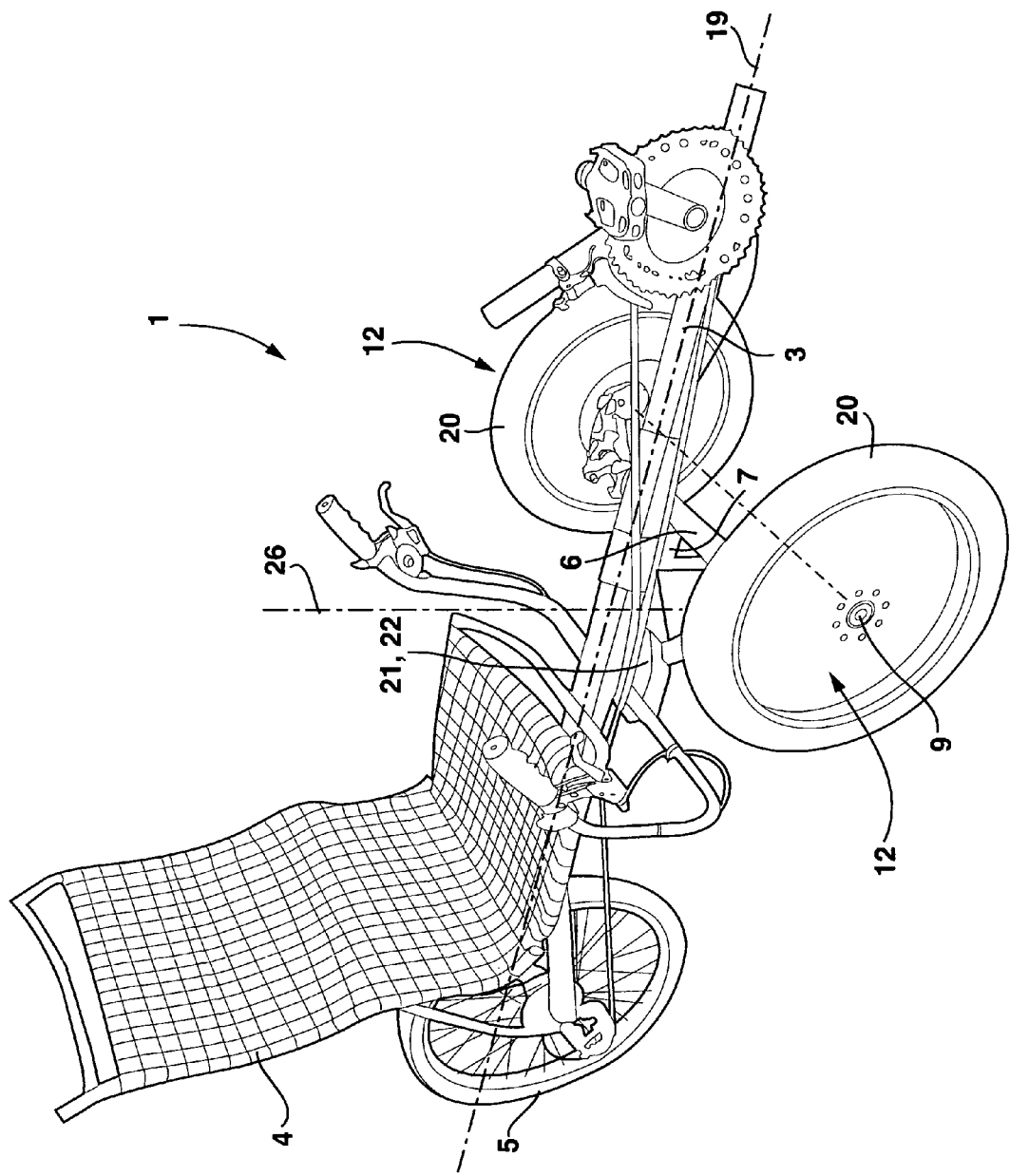
FIG. 1 is a perspective view of the Lean to Steer Vehicle.
Figure 2:
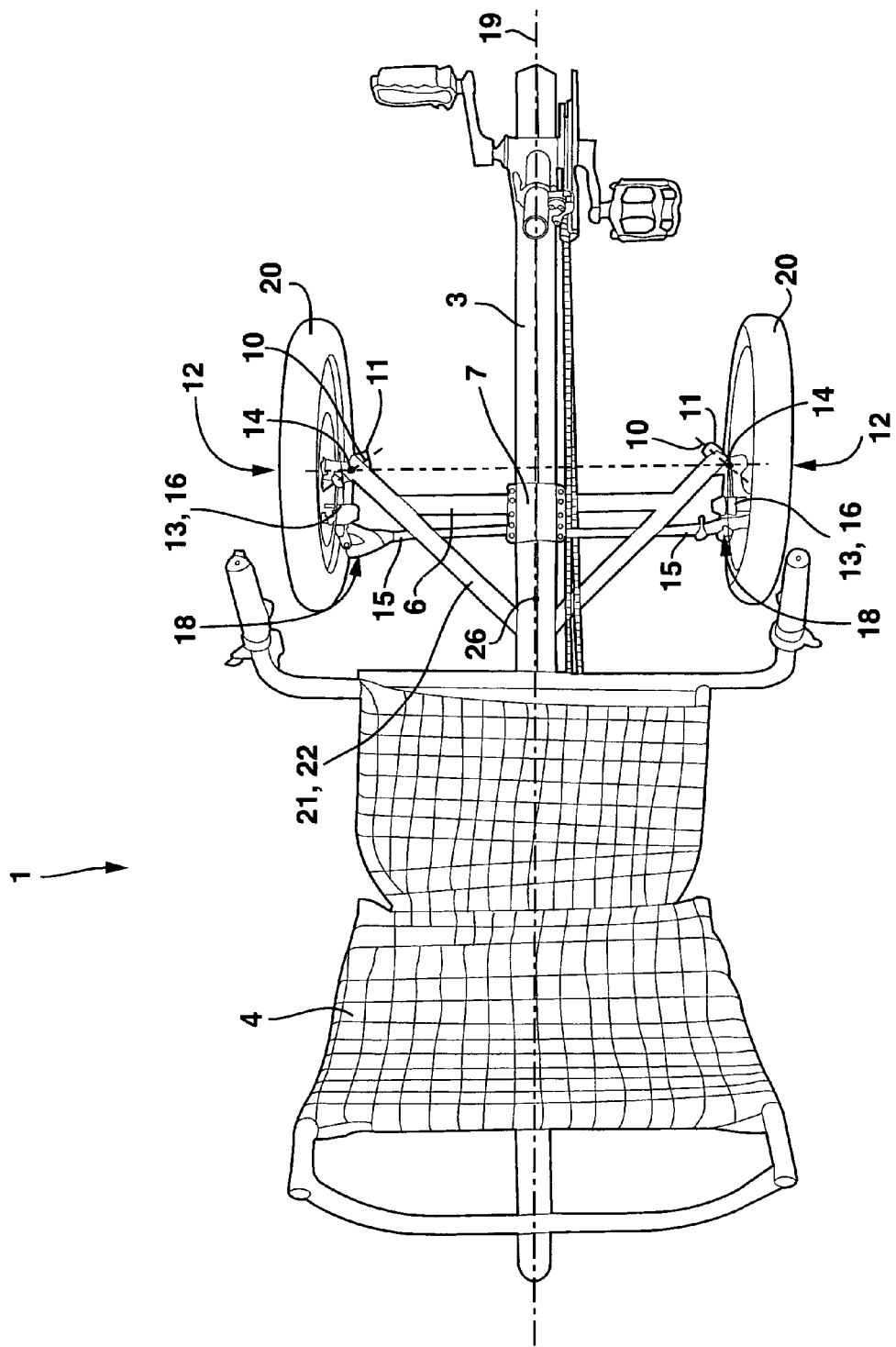
FIG. 2 is a top view of FIG. 1.
Figure 3:
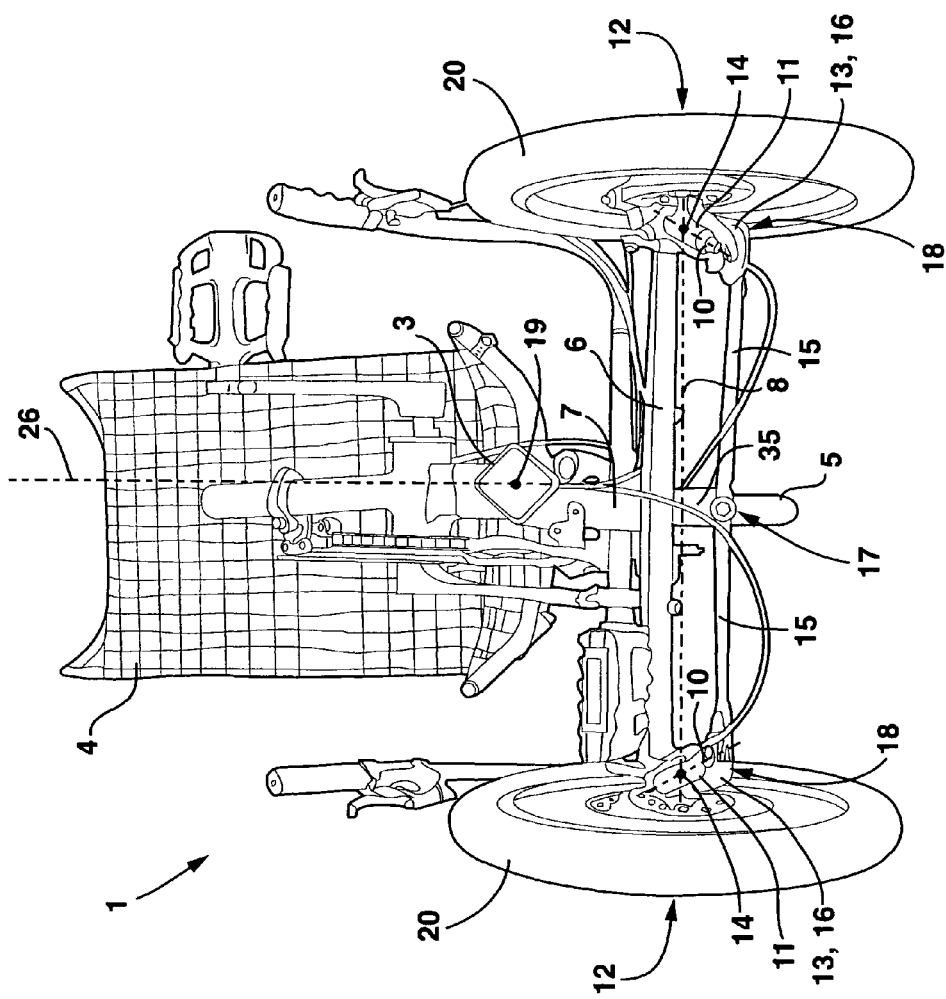
FIG. 3 is a front view of FIG. 1.
Figure 5:
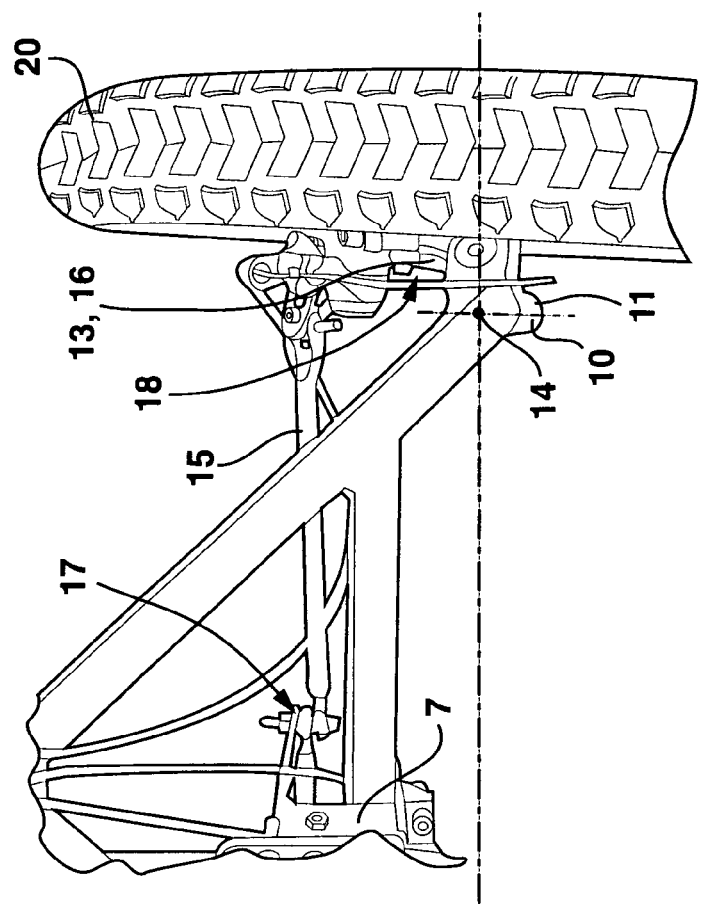
FIG. 5 is a top detail view of a tie rod and wheel spindle.
Figure 4:
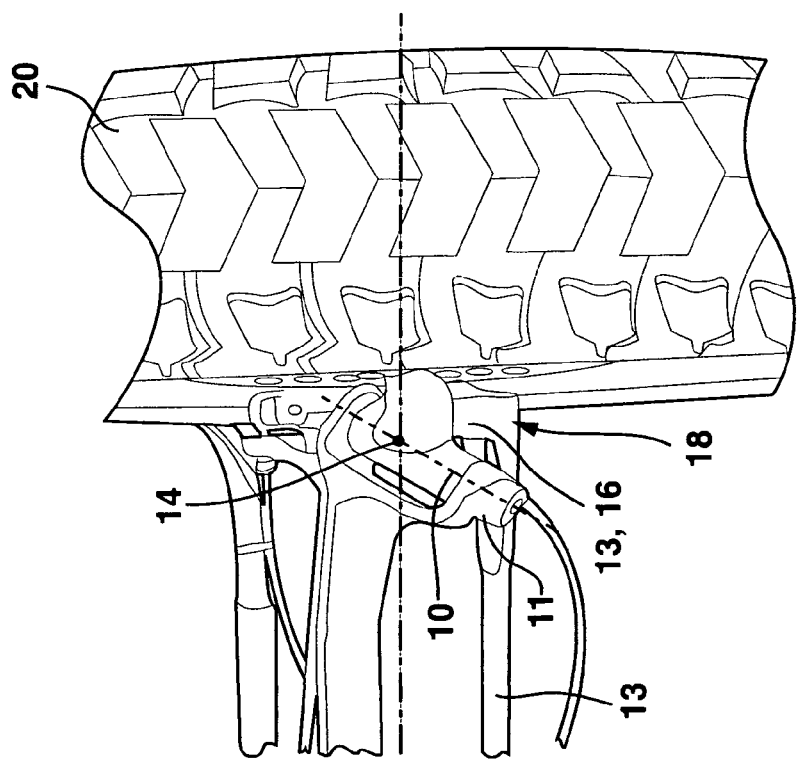
FIG. 4 is a front detail view of a kingpin assembly.
Figure 6:
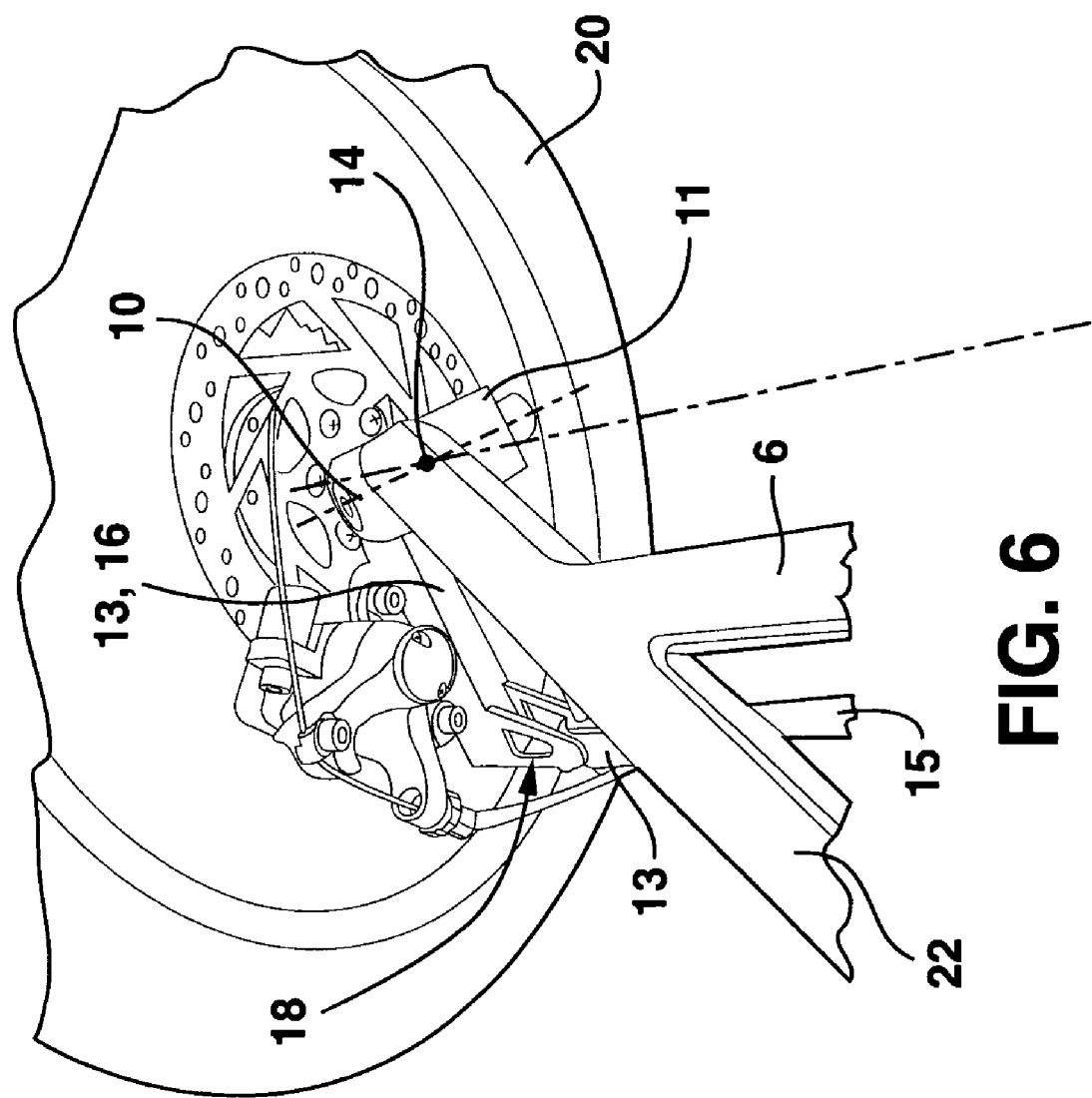
FIG. 6 is a perspective detail view of a steering knuckle and tie-rod connection.
Figure 7:
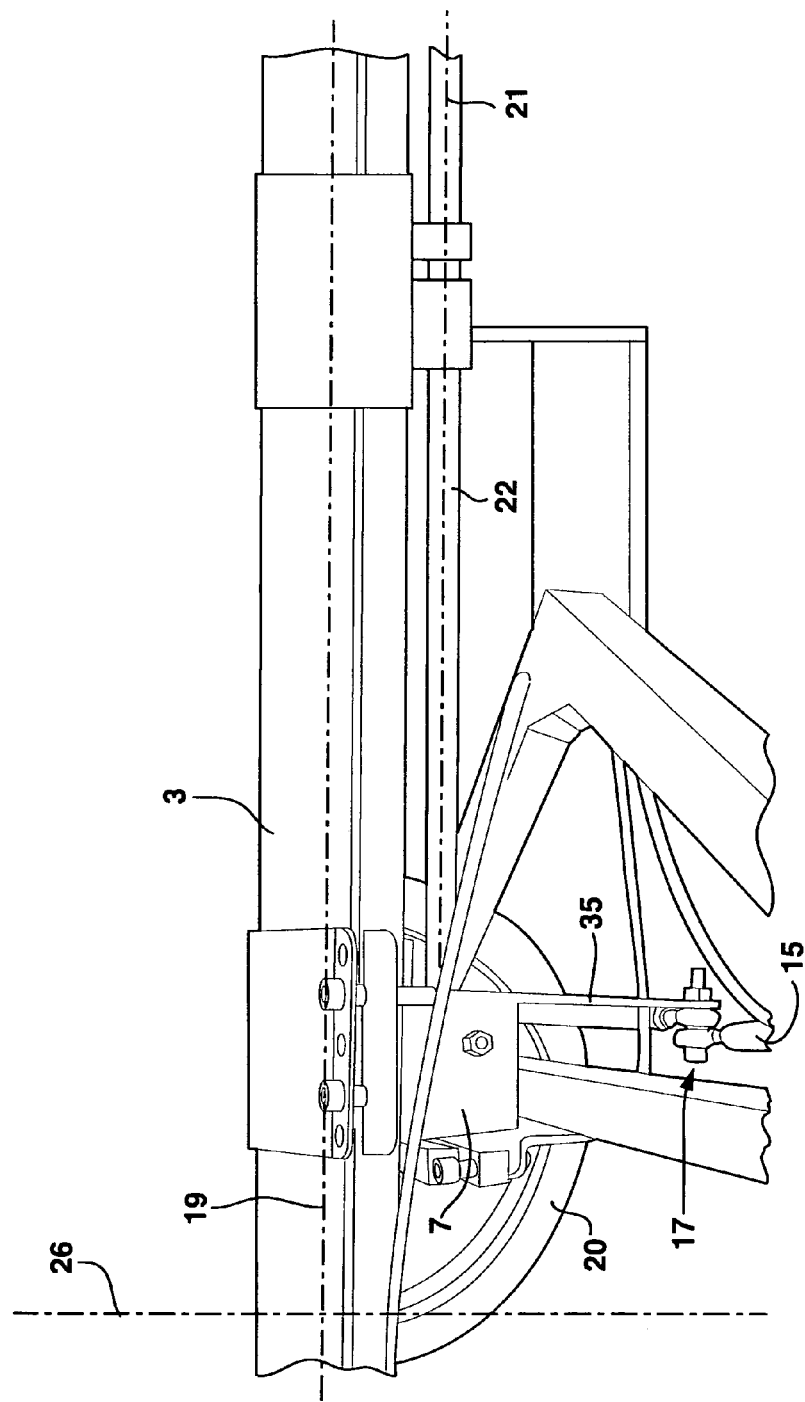
FIG. 7 is a perspective detail view of a first and second tie rod connection and tortion bar.
Figure 8:
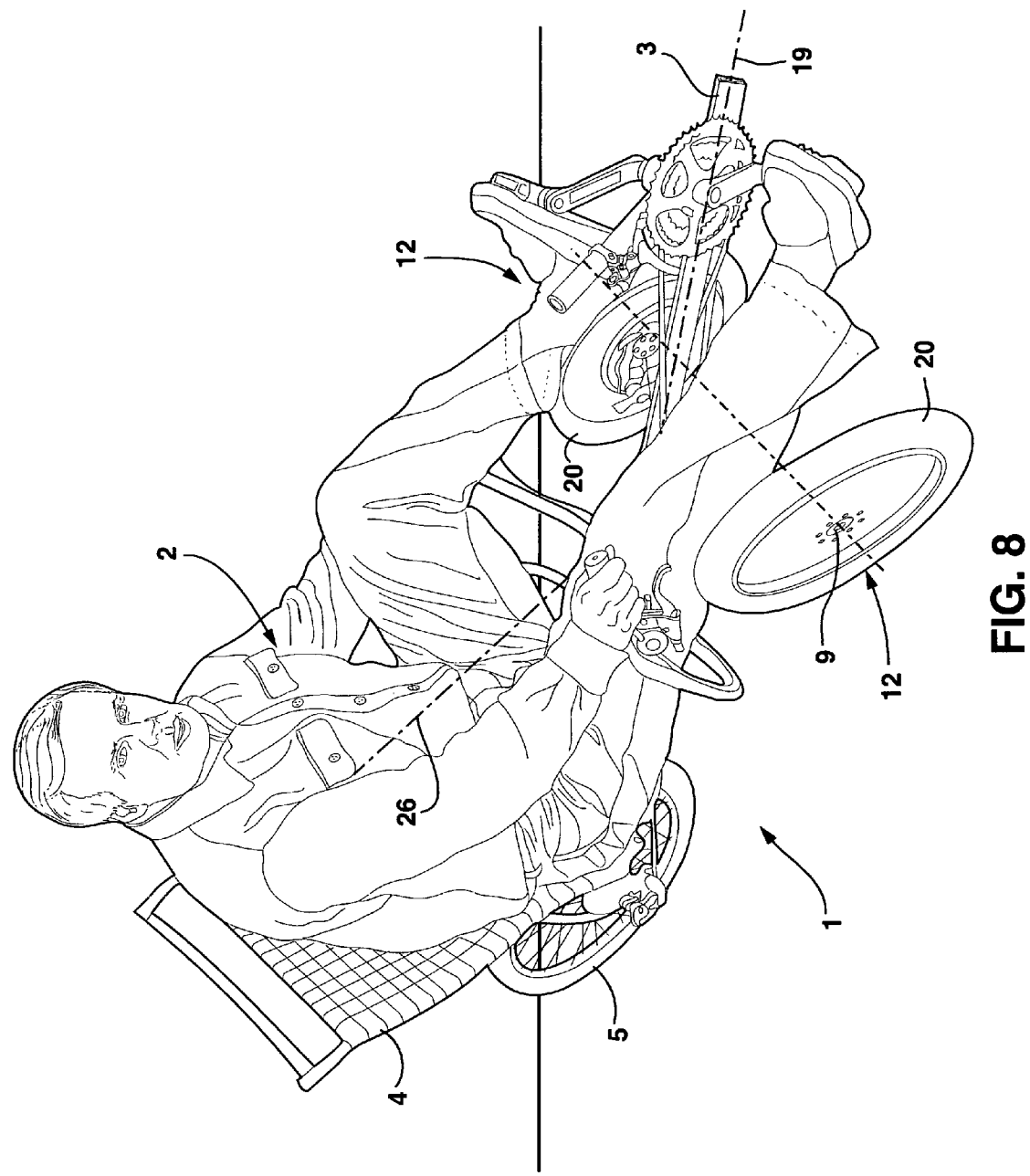
FIG. 8 is a perspective view of the invention in use.

The Lean to Steer Vehicle 1 is a multi-wheeled vehicle wherein steering is relate to operator 2 lean. In one embodiment, said vehicle 1 comprises: a longitudinal main frame 3 having a seat 4, and at least one rear wheel 5, a perpendicular frame 6, means for axially pivotally connecting 7 said main frame 3 to said perpendicular frame 6 for providing pivotal motion of said longitudinal main frame 3 through an approximately 90 degree arc about a generally longitudinal axis 19, a pair of wheel spindles 9, a pair of steering knuckle assemblies 11 for axially pivotally attaching said wheel spindles 9 to opposite ends 12 of said perpendicular frame 6 wherein the pivot axis 10, implemented by said steering knuckle assemblies 11, of said wheel spindles 9 is selected to cause left-right steering of said vehicle 1 when said wheel spindles 9 tilt and each steering knuckle assembly 11 further comprising a trailing arm 13 connection 14 positioned to cause tilt and steer of said wheel spindle 9 via said trailing arm 13 attachment means 16, a second end of tie rod 15 having a first end 17 connected to said longitudinal frame by a vertical arm 35 and extending past said perpendicular frame 6 and a second end 18, a first trailing arm 13 connected to said second end 18 of said tie rod 15 and to the trailing arm 13 connection 14 of one steering knuckle assembly 11, a second trailing arm 13 connected to said second end 18 of said second end of tie rod 15 and to the trailing arm 13 connection 14 of the other steering knuckle assembly 11.

The front wheels support the Lean to Steer Vehicle 1 via rotatable attachment to the wheel spindles 9. The wheel spindles 9 in turn support the steering knuckle assemblies 11 which in turn support the perpendicular frame 6. In some embodiments wheel spindles are a part of steering knuckle weldments. The perpendicular frame 6 is axially pivotally attached to the longitudinal main frame 3 to provide support for the longitudinal main frame 3 and permit the longitudinal main frame 3 to rotate about its tortion bar axis 19 producing steering of the Lean to Steer Vehicle 1.

With the operator 2 seated and facing forward, Steering of the Lean to Steer Vehicle 1 is achieved by applying counter-clockwise torque, relative to the forward motion of the vehicle, to the longitudinal main frame 3 to turn to the operator's 2 left and clockwise torque to turn to the operator's 2 right. This rotary motion is conveyed to the means for axially pivotally connecting 7 to the longitudinal main frame 3 and thereby on to the connecting points 13 of the steering knuckle assemblies 11. This in turn causes the steering knuckle assemblies 11 to pivot the wheel spindles 9 about the steering knuckle pivot axis 10. The pivoting of the wheel spindles 9 about the pivot axis 10 causes the wheel spindles 9 to tilt and steer in the direction corresponding to the direction of motion of the trailing arm 13. This tilt and steer of the wheel spindles 9 in turn cause a corresponding tilt and steer of wheels 20 attached to the wheel spindles 9.

Figure 9:
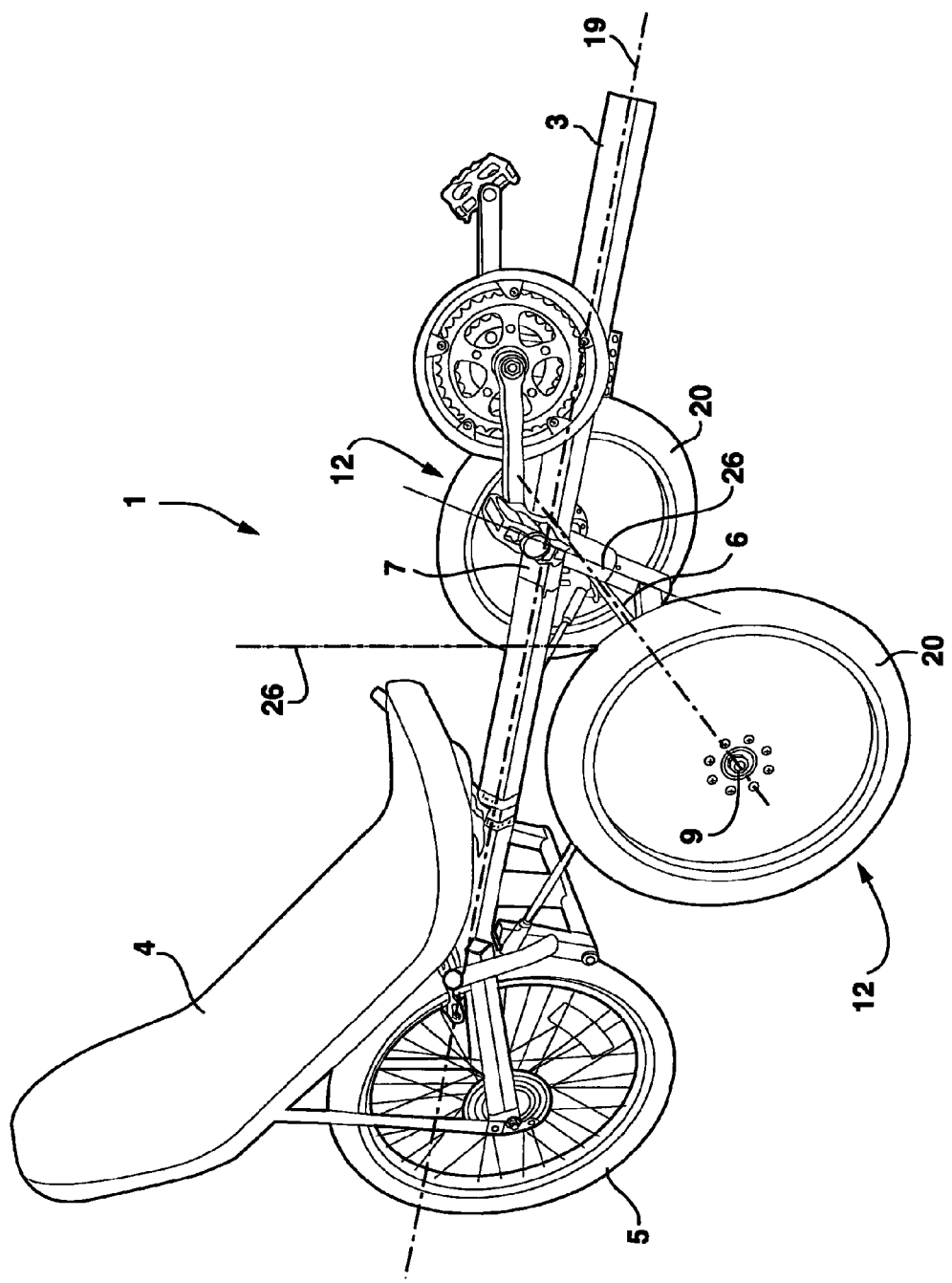
FIG. 9 is a perspective view of a second embodiment of the invention.
Figure 10:
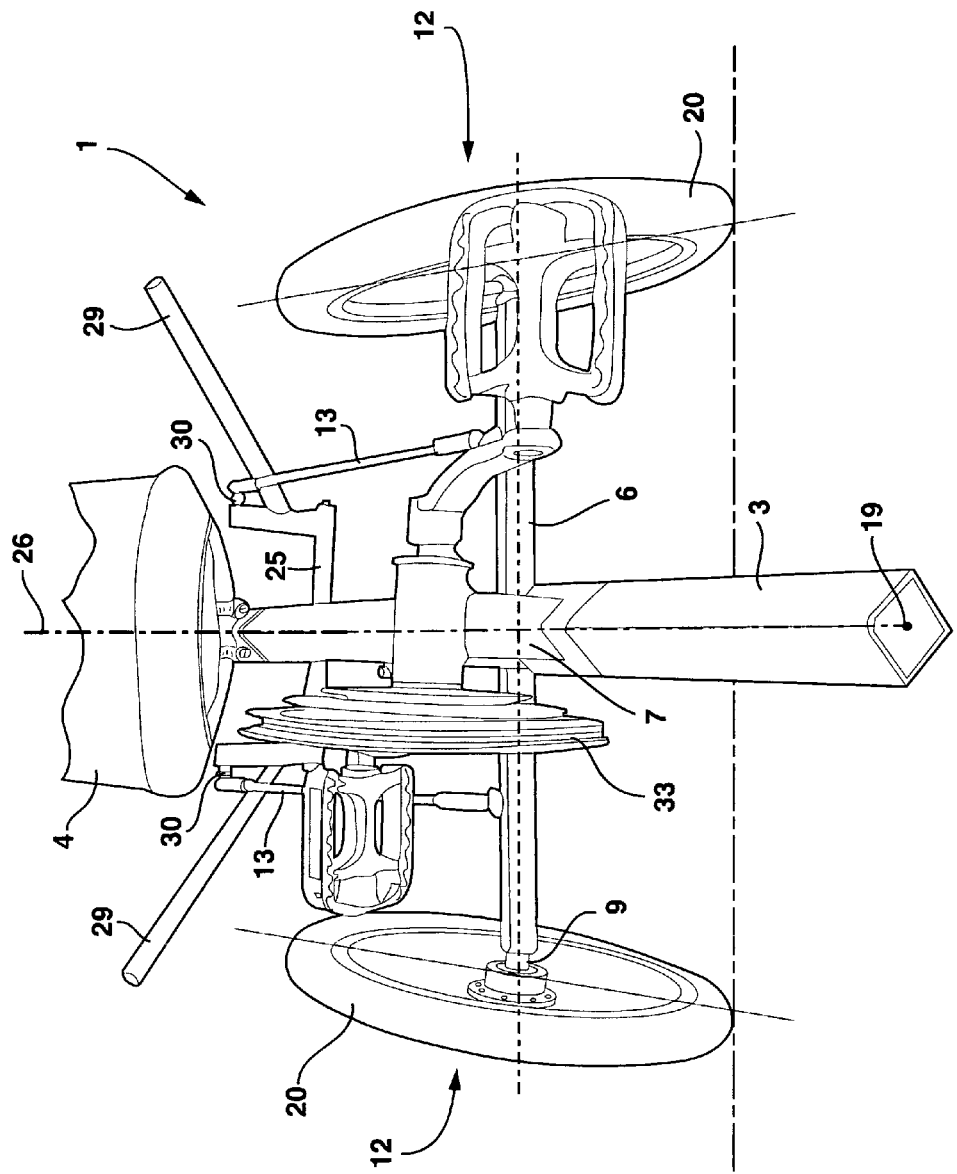
FIG. 10 is a front perspective view of FIG. 9.
Figure 11:
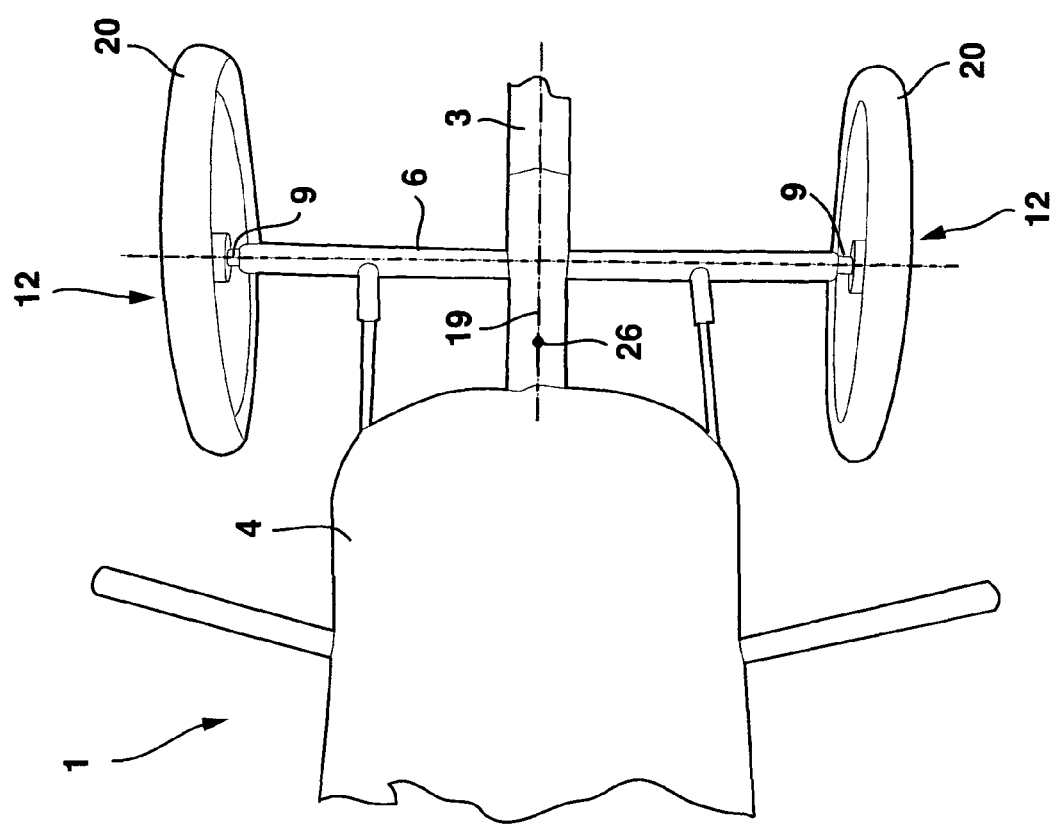
FIG. 11 is a top detail view of FIG. 10.
Figure 12:
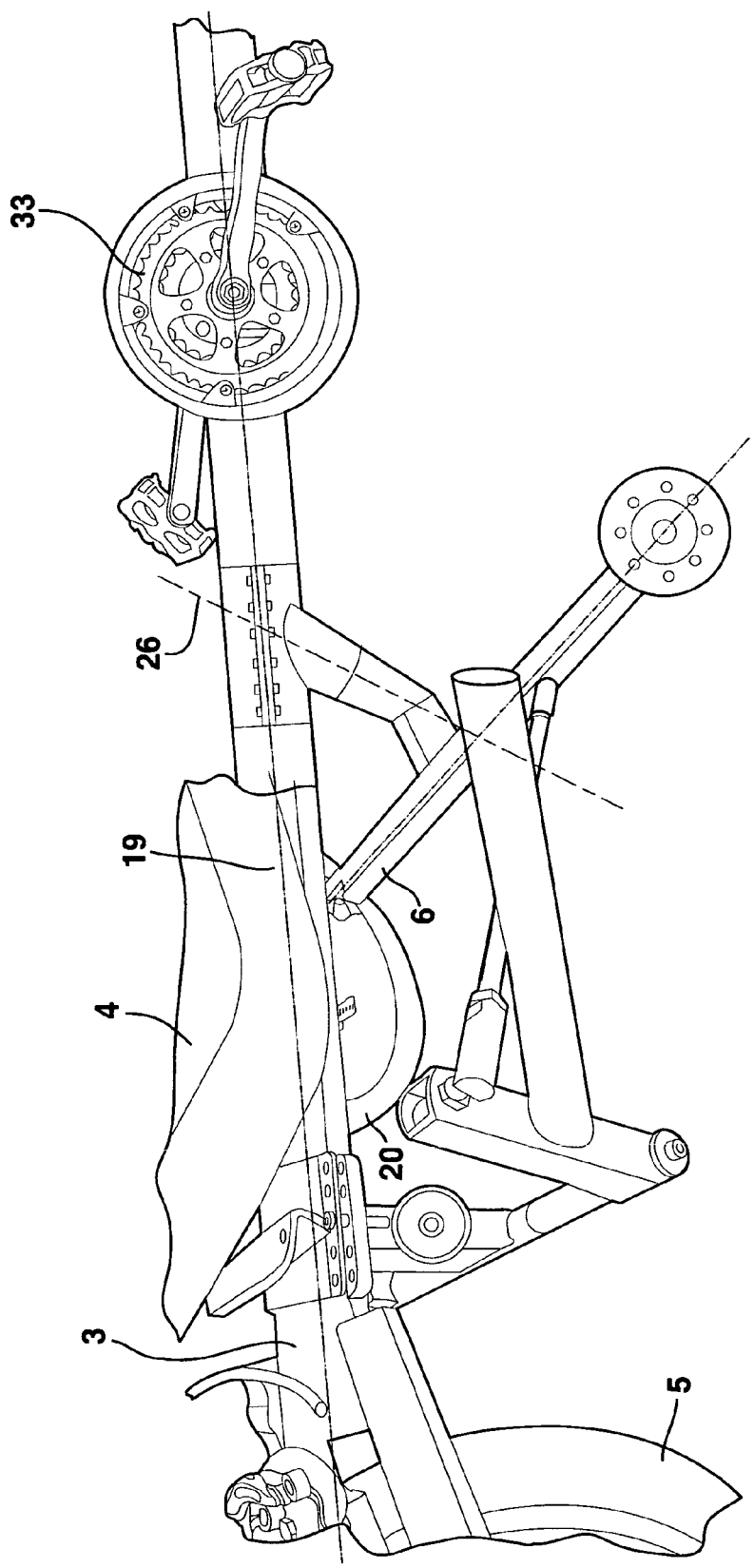
FIG. 12 is a perspective detail view of a mechanical connection from FIG. 9.
Figure 13:
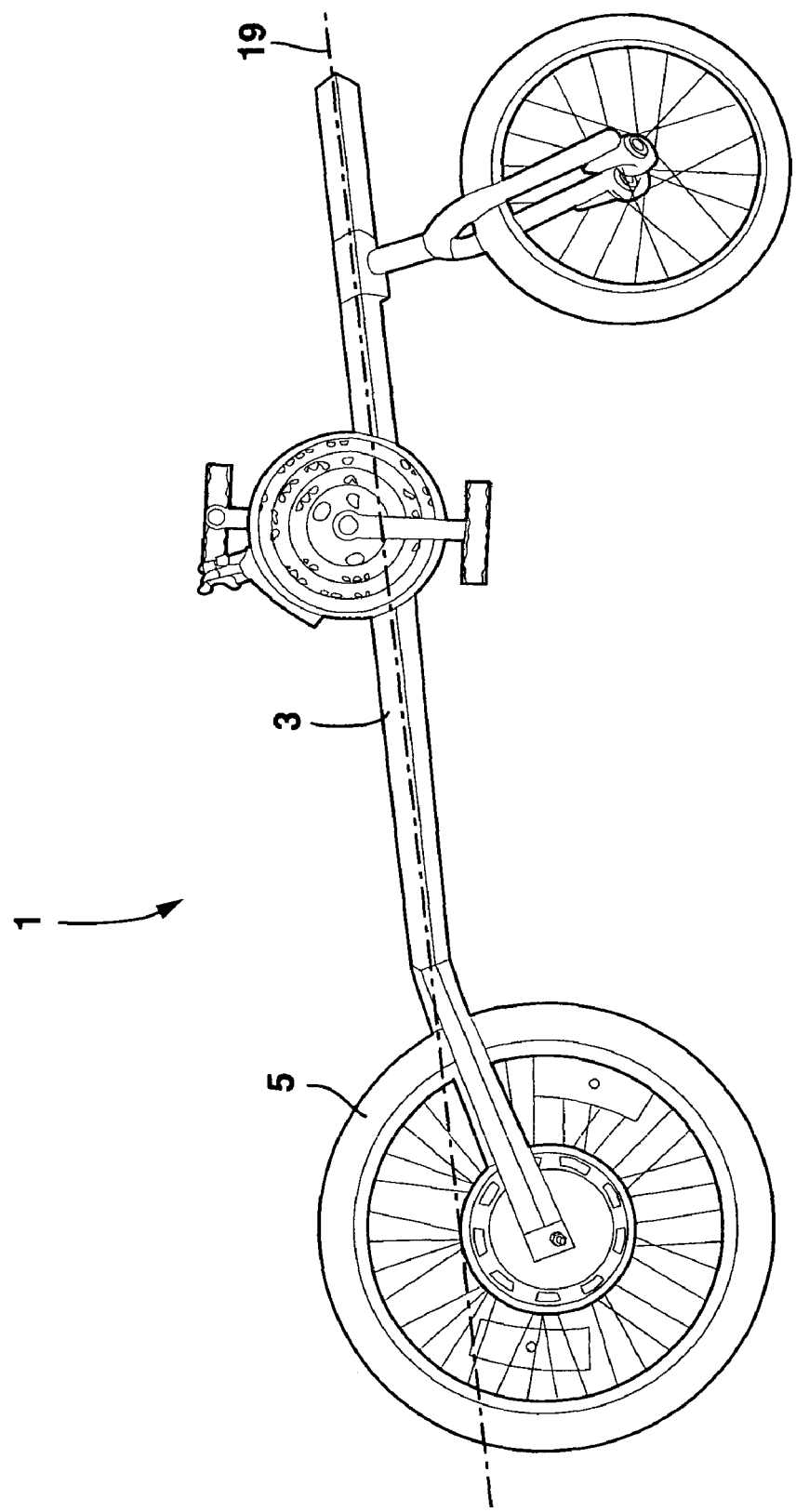
FIG. 13 is a long frame configuration assembled from components of the invention.

FIG. 9 illustrates another embodiment of the Lean to Steer Vehicle 1 which achieves steering by pivoting the perpendicular frame 6 about an inclined axis 26. In this embodiment the multi-wheeled vehicle 1 steering is derived from operator input on steering handles 29. Tie rod second ends 15 are connected to a pivotal attachment 30 to the perpendicular frame 6 to pivot about a vertical axis. However, the connection to the longitudinal main frame 3 is a generally inclined axis 26. This causes the longitudinal mainframe 3 to tilt left or right, causing weight to transfer toward the inside of any turn. The front wheels on the steer lean tricycle do not tilt, but have a castering action.

The Lean to Steer Vehicle 1 may further comprise a centering mechanism 21 for causing the longitudinal main frame 3 to return to a preset position relative to said perpendicular frame 6. The centering mechanism 21 may be a torsion bar assembly 22 or coil spring under tension.

It will be apparent to those of ordinary skill in the art that the longitudinal frame 3 may be configured to accommodate three or more wheels 20 and remain within the scope of the present invention 1.

It is also apparent to those of ordinary skill in the art that the perpendicular frame 6 may be replaced by one fork and one wheel attached the longitudinal main frame 3 by an attachment means 16 preserving the ability to adjust the wheelbase of the lean to steer vehicle.

Figure 16:
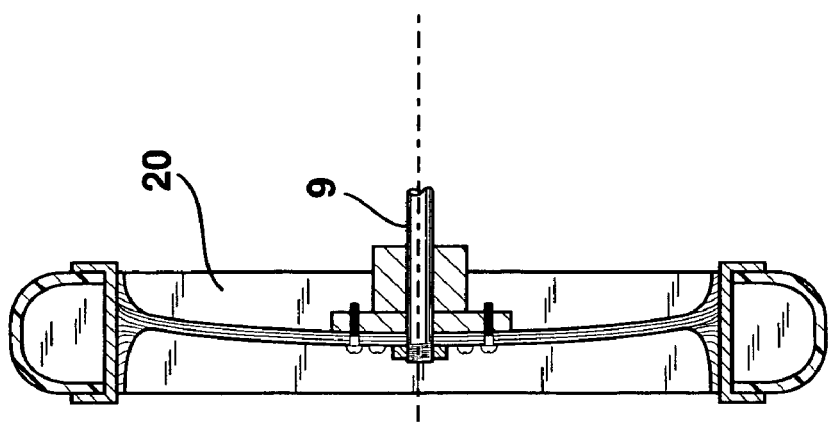
FIG. 16 is a sectional view of FIG. 14.
Figure 15:
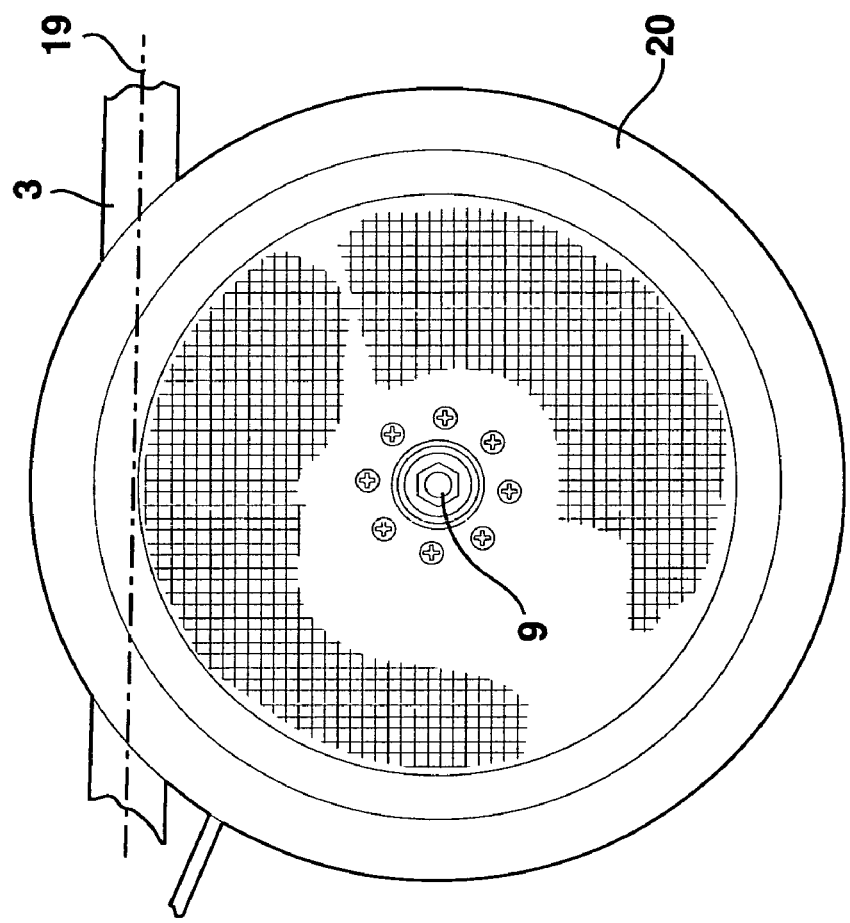
FIG. 15 is an elevational view of a wheel from the invention.
Figure 18:
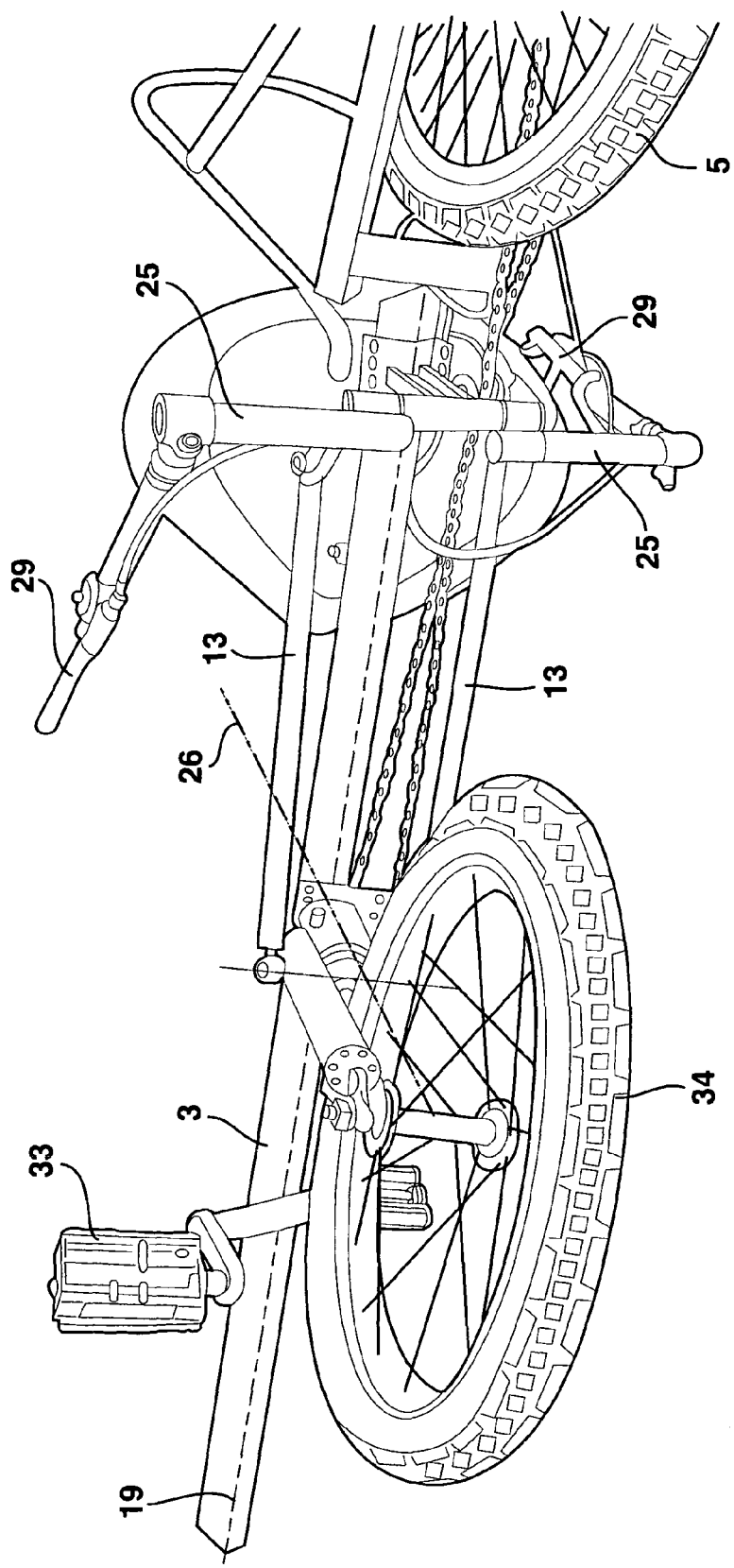
FIG. 18 is a detail view of a third tie rod and steering embodiment.

The wheels 20 may be of any construction which provides support to the vehicle and allow for rotational attachment to the wheel spindles 9. FIGS. 15 and 16 illustrate an embodiment of a suitable wheel featuring a concave shape permitting rotational attachment to the spindle 9 with reduced overall horizontal dimensions by virtue of the attachment means, and other devices such as brakes, being placed within the circumference of the wheel 20.

Figure 14:
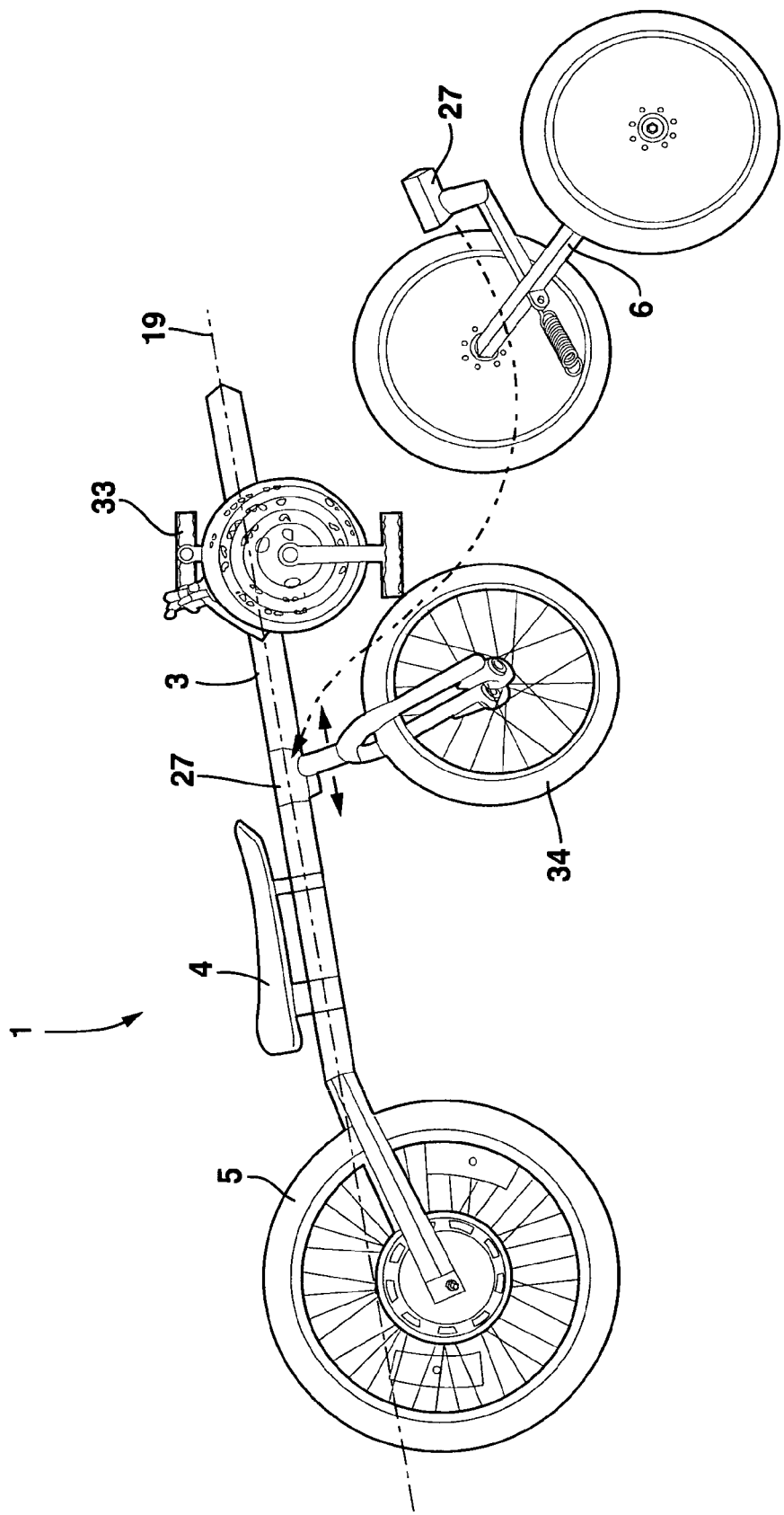
FIG. 14 is a short frame configuration assembled from components of the invention.

It will be appreciated from FIG. 14 that the Lean to Steer Vehicle 1 may be implemented using modular construction. The modular components include: a longitudinal main frame 3, a seat 4, a rear wheel 5, a pedal assembly 33, a single front wheel assembly 34, and a perpendicular frame 6. The relative positions of the seat 4, rear wheel 5, pedal assembly 33, and single front wheel assembly 34 are chosen for the best fit to the operator 2 and the envisioned application. In applications where stability of the vehicle 1 is paramount, a perpendicular frame 6 would be chosen over the single front wheel assembly 34. It will also be appreciated that the placement of the seat 4 relative to the pedal assembly 33 is a function of the size of the operator 2 and length of the operator's 2 legs, while the relationship between the rear wheel 5 and the single front wheel 34 or perpendicular frame 6 is significant in determining the vehicle's 1 turning radius. These relationships, and others, will dictate the relative positioning of the components along the longitudinal main frame 3 so that any specific sequence of components to be found in any particular configuration along the longitudinal main frame 3 is envisioned.

I claim:

1. A multi-wheeled vehicle wherein steering is derived from operator lean comprising:
    a) A longitudinal main frame having a seat, and at least one rear wheel;
    b) A perpendicular frame;
    c) Means for pivotally connecting said longitudinal main frame to said perpendicular frame for providing pivotal motion of said longitudinal main frame through an approximately 90 degree arc about a generally longitudinal axis;
    d) A pair of wheel spindles;
    e) A pair of steering knuckle assemblies for pivotally attaching said wheel spindles to opposite ends of said perpendicular frame establishing a pivot axis, implemented by said steering knuckle assemblies, said pivot axis of said spindles is selected to cause said spindles to rotate relative to said perpendicular frame about said pivot axis, said rotation causing said spindles to simultaneously tilt and steer while said perpendicular frame remains perpendicular to said longitudinal main frame, each of said steering knuckles including a trailing arm, said pivot axis is inclined rearward and centerward relative to said vehicle;
    f) A vertical arm having an upper end connected to said longitudinal frame, and a lower end, said lower end extending downward past said perpendicular frame;
    g) A first tie rod having a first end connected to said lower end of said vertical arm, and a second end connected to the trailing arm of one of the steering knuckles;
    h) A second tie rod connected to said second end of said vertical arm and to the trailing arm of the other steering knuckle.

2. The multi-wheeled vehicle of claim 1 further comprising a centering mechanism for causing the longitudinal main frame to return to a preset position relative to said perpendicular frame.

3. The multi-wheeled vehicle of claim 2 wherein the centering mechanism is a torsion bar.

4. The multi-wheeled vehicle of claim 2 wherein the centering mechanism is a coil spring under tension.

* * * * *